United States Patent
He et al.

(10) Patent No.: US 12,137,262 B2
(45) Date of Patent: Nov. 5, 2024

(54) INFORMATION PUSH METHOD, APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Xing He, Beijing (CN); Song Feng, Beijing (CN); Chaopeng Liu, Beijing (CN); Yiming Xiong, Beijing (CN); Yichi Wang, Beijing (CN); Yu Sun, Beijing (CN); Hai Ning, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/600,363

(22) PCT Filed: Jun. 1, 2021

(86) PCT No.: PCT/CN2021/097731
§ 371 (c)(1),
(2) Date: Sep. 30, 2021

(87) PCT Pub. No.: WO2022/012197
PCT Pub. Date: Jan. 20, 2022

(65) Prior Publication Data
US 2022/0321936 A1 Oct. 6, 2022

(30) Foreign Application Priority Data
Jul. 17, 2020 (CN) .......................... 202010694744.3

(51) Int. Cl.
*H04N 21/262* (2011.01)
*H04L 67/55* (2022.01)
(Continued)

(52) U.S. Cl.
CPC ....... *H04N 21/26258* (2013.01); *H04L 67/55* (2022.05); *H04L 67/563* (2022.05); *H04N 21/232* (2013.01)

(58) Field of Classification Search
CPC ........... H04N 21/26258; H04N 21/232; H04N 21/41407; H04N 21/8113; H04N 21/84;
(Continued)

(56) References Cited

U.S. PATENT DOCUMENTS

2002/0129375 A1* 9/2002 Kim .................. H04N 21/8549
348/E5.103
2005/0105528 A1* 5/2005 Kobayashi ....... H04N 21/23614
(Continued)

FOREIGN PATENT DOCUMENTS

| CN | 102906755 A | 1/2013 |
|---|---|---|
| CN | 102938861 A | 2/2013 |

(Continued)

OTHER PUBLICATIONS

"Copyright Basics." Nov. 30, 2019. https://web.archive.org/web/20191130143444/https://www.uspto.gov/ip-policy/copyright-policy/copyright-basics). (Year: 2019).*

(Continued)

*Primary Examiner* — Farzana Hossain

(57) ABSTRACT

An information push method, apparatus, electronic device and storage medium provided by the embodiments of the present disclosure. A type identification corresponding to a media work is displayed when a first page of playing the media work is displayed, and the page is switched when a user triggers the type identification on the first page to display the second page corresponding to the type identification to the user. Since information of other media works corresponding to the type identification of the media work can be displayed on the second page, the user's demand for (Continued)

obtaining push information can be effectively met; at the same time, since the user can directly obtain the second page in a manner of direct triggering the type identification, and the obtaining operation process is very concise, then the solution provided by the present disclosure can optimize an user experience while improving information push efficiency.

15 Claims, 7 Drawing Sheets

(51) Int. Cl.
*H04L 67/563* (2022.01)
*H04N 21/232* (2011.01)

(58) Field of Classification Search
CPC ..... H04L 67/55; H04L 67/563; H04L 67/568; G06F 16/4393; G06F 16/44; G06F 16/9538; G06F 16/958; G06F 16/489
See application file for complete search history.

(56) References Cited

U.S. PATENT DOCUMENTS

| | | | | |
|---|---|---|---|---|
| 2006/0195447 | A1* | 8/2006 | Chang | H04N 21/47214 |
| 2006/0265421 | A1* | 11/2006 | Ranasinghe | G06F 16/637 |
| 2007/0006262 | A1* | 1/2007 | Cleron | H04N 21/858 348/E7.071 |
| 2007/0157248 | A1* | 7/2007 | Ellis | H04N 21/25891 725/47 |
| 2008/0163307 | A1* | 7/2008 | Coburn | H04N 21/4112 348/E7.071 |
| 2009/0138457 | A1* | 5/2009 | Askey | G06F 16/435 707/999.005 |
| 2011/0138412 | A1* | 6/2011 | Roberts | H04N 21/8133 725/87 |
| 2013/0158688 | A1* | 6/2013 | Barber | H04N 21/458 700/91 |
| 2017/0054566 | A1 | 2/2017 | Nitschke | |
| 2017/0188095 | A1* | 6/2017 | Zhao | H04N 21/44224 |
| 2017/0331779 | A1 | 11/2017 | Chen et al. | |
| 2018/0253173 | A1 | 9/2018 | Reiley et al. | |
| 2019/0012008 | A1* | 1/2019 | Yoon | G06F 1/1652 |
| 2021/0076102 | A1* | 3/2021 | Patel | H04N 21/8405 |

FOREIGN PATENT DOCUMENTS

| | | |
|---|---|---|
| CN | 103001925 A | 3/2013 |
| CN | 105405040 A | 3/2016 |
| CN | 110177306 A | 8/2019 |
| CN | 110245256 A | 9/2019 |
| CN | 111198956 A | 5/2020 |
| CN | 111858974 A | 10/2020 |
| EP | 3489844 A1 | 5/2019 |

OTHER PUBLICATIONS

Chinese Patent Application No. 202010694744.3, Notice of Allowance mailed Feb. 11, 2022, 4 pages.
Chinese Patent Application No. 202010694744.3, Third Office Action mailed Oct. 9, 2021, 5 pages.
Chinese Patent Application No. 202010694744.3, First Office Action mailed Apr. 27, 2021, 6 pages.
Chinese Patent Application No. 202010694744.3, Second Office Action mailed Jul. 16, 2021, 5 pages.
Examination Report issued Mar. 14, 2023 in Indian Patent Application No. 202127044222, with English translation (7 pages).
Extended Search Report issued Aug. 4, 2023 in EP Patent Application No. 21841958.8 (9 pages).
Mohsen Kamalzadeh et al. TagFlip: Active Mobile Music Discovery with Social Tags, Intelligent User Interfaces, Mar. 7, 2016, pp. 19-30.
Anonymous: "Cache (computing)—Wikipedia", Jul. 7, 2019, Retrieved from the Internet: URL: https://en.wikipedia.org/w/index.php?title=Cache_(computing)&oldid=905228973 (9 pages).
Anonymous: "Cache replacement policies—Wikipedia", Dec. 14, 2019, Retrieved from the Internet: URL: https://en.wikipedia.org/w/index.php?title=Cache_replacement_policies&oldid=930744547 (9 pages).

* cited by examiner

Determine a type identification of a media work, where the type identification is used to indicate a release state of the media work, where determining the release state of the media work includes he following steps 1) and 2):
step 1): determining a release timestamp of the media work, where the release timestamp is determined according to creation time of the media work and a release cycle, the creation time refers to a time when the media work is first released after a copyright is obtained, the release cycle refers to a length of time that the media work is considered as the new media work, release timestamps of media works are stored in a timestamp cache list, and the timestamp cache list further includes storage times of the release timestamps;
step 2): determining the release state of the media work according to a current timestamp and the release timestamp

↓

Display a first page of playing the media work, where the first page includes the type identification of the media work

↓

In response to a first operation of triggering on the type identification of the first page, switch the first page to a second page corresponding to the type identification

FIG. 11

INFORMATION PUSH METHOD, APPARATUS, ELECTRONIC DEVICE AND STORAGE MEDIUM

CROSS-REFERENCE TO RELATED APPLICATIONS

This application is a national stage of International Application No. PCT/CN2021/097731, filed on Jun. 1, 2021, which claims priority to Chinese Patent Application No. 202010694744.3, filed on Jul. 17, 2020. Both of the aforementioned applications are hereby incorporated by reference in their entireties.

TECHNICAL FIELD

Embodiments of the present disclosure relate to the field of data processing technologies and, in particular, to an information push method, apparatus, electronic device and storage medium.

BACKGROUND

With the development of culture, users using terminals to browse media works has become an indispensable entertainment way in life.

When browsing a media work, a user usually expects to obtain other media works related to the media work, or to obtain information or status of the media work, for example, whether the media work is a latest one. In the prior art, the user needs to exit the page of the media work currently browsed, and then select a push page related to the media work in a provided push bar, and trigger to browse.

Obviously, the process of such operation method and information acquisition method is very cumbersome, and is of low acquisition efficiency. In addition, there is a lack of active information push methods to inform the user of the information or status of the media work.

SUMMARY

In view of the foregoing problems, embodiments of the present disclosure provide an information push method, apparatus, electronic device and storage medium.

In a first aspect, an embodiment of the present disclosure provides an information push method, including:
displaying a first page for playing a media work, where the first page includes a type identification of the media work;
responding to a first operation of triggering on the type identification of the first page, switching the first page to a second page corresponding to the type identification.

In a second aspect, an embodiment of the present disclosure provides an information push apparatus, including:
a display and play module, configured to display a first page of a media work, where the first page includes a type identification of the media work;
a communication interaction module, configured to respond to a first operation of triggering on the type identification of the first page;
the display and play module, further configured to switch the first page to a second page corresponding to the type identification.

In a third aspect, an embodiment of the present disclosure provides an electronic device, including: at least one processor and a memory;

the memory stores computer-executable instructions;
the at least one processor executes the computer-executable instructions stored in the memory to cause the at least one processor to execute the information push method according to the first aspect and various possible designs of the first aspect.

In a fourth aspect, an embodiment of the present disclosure provides a computer-readable storage medium, the computer-readable storage medium stores computer-executable instructions, and when the computer-executable instructions are executed by a processor, the information push method according to the first aspect and various possible designs of the first aspect is implemented.

In a fifth aspect, an embodiment of the present disclosure provides a computer program product, the computer program product includes: a computer program, the computer program is stored in a readable storage medium, at least one processor of an electronic device can read the computer program from the readable storage medium, and the at least one processor executes the computer program to cause the electronic device to execute the method according to any one of the first aspect.

In a sixth aspect, an embodiment of the present disclosure provides a computer program, the computer program is stored in a readable storage medium, and at least one processor of an electronic device can read the computer program from the readable storage medium, and the at least one processor executes the computer program to cause the electronic device to execute the method according to any one of the first aspect.

In the information push method, apparatus, electronic device and storage medium provided by the embodiments of the present disclosure, the type identification corresponding to the media work is displayed when the first page for playing the media work is displayed, and the page is switched when the user triggers the type identification on the first page, to display the second page corresponding to the type identification to the user. Since information of other media works corresponding to the type identification of the media work can be displayed on the second page, the user's demand for obtaining push information can be effectively met; at the same time, since the user can directly obtain the second page in a manner of direct triggering the type identification, and the obtaining operation process is very concise, then the solution provided by the present disclosure can optimize an user experience to the greatest extent while improving information push efficiency.

BRIEF DESCRIPTION OF DRAWINGS

In order to more cleanly explain technical solutions in embodiments of the present disclosure or the prior art, the following will briefly introduce drawings that need to be used in description of the embodiments or the prior art. Obviously, the drawings descripted as follows are some embodiments of the present disclosure. For those of ordinary skill in the art, other drawings can be obtained based on these drawings without creative effort.

FIG. 11 is a schematic flowchart of yet another information push method provided by an embodiment of the present disclosure.

DESCRIPTION OF EMBODIMENTS

In order to make objectives, technical solutions and advantages of embodiments of the present disclosure clearer, the technical solutions in the embodiments of the present disclosure will be described clearly and completely in conjunction with the drawings in the embodiments of the present disclosure. Obviously, the described embodiments are a part of the embodiments of the present disclosure, but not all of the embodiments. On the basis of the embodiments in the present disclosure, all other embodiments obtained by those of ordinary skill in the art without creative effort shall fall within a protection scope of the present disclosure.

With the development of culture, media works of different forms including music works, literary works, film and television works have gradually entered people's life. Playing and browsing these media works by using a media platform that is carried on a terminal has become an indispensable part of people's life.

When playing and browsing a media work, a user may have an actual demand for obtaining information about other media works related to the media work. When obtaining information about other media works, the user needs to exit a play page of the media work currently being played and browsed, then find a push page related to the media work in push pages of various types of media provided by the media platform, and select to enter the push page, then play and browse other media works provided on the push page.

Figure 1:
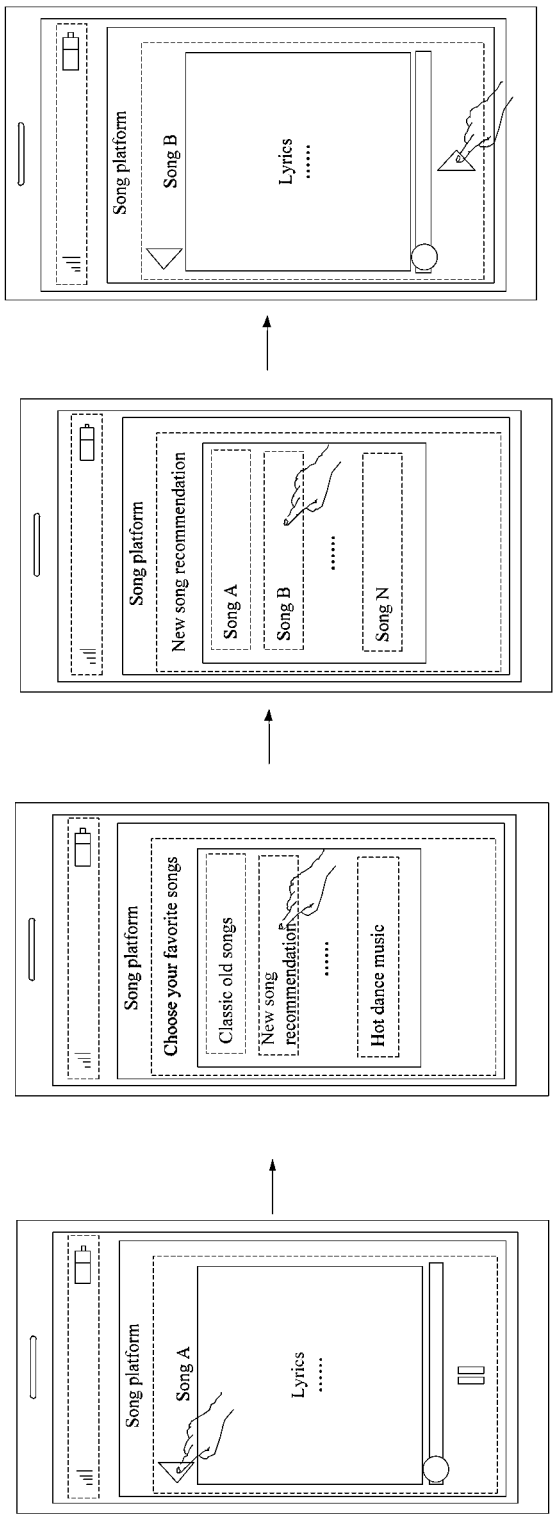
FIG. 1 is a schematic diagram of an existing information push interface for media works.

Taking music work as an example, FIG. 1 is a schematic diagram of an existing information push interface for media works. As shown in FIG. 1, when playing a newly released song, a user may also want to browse other newly released songs. At this time, the user needs to exit the play page of the song currently played, and then find a new song recommendation page in various recommendation pages provided by a music play platform, select to enter the new song recommendation page, and browse to play other newly released songs provided on the new song recommendation page.

Obviously, the user needs to perform a plurality of steps of selecting and triggering operations when acquiring more information, and a process of the operations is very cumbersome, which is unfavorable for use. In addition, this approach will also affect pushing efficiency of the media platform in pushing information to users.

In view of this problem, the embodiments according to the present disclosure provide a method, where a type identification corresponding to a media work is displayed while a first page of playing the media work is displayed, and the type identification is used as an interface for page switching, to enable page switching when a user triggers the type identification on the first page, and displaying a second page corresponding to the type identification to the user. Since information of other media works corresponding to the type identification of the media work can be displayed on the second page displayed after switching, on the one hand, information can be actively pushed to the user to meet the user's demand for obtaining the push information, and on the other hand, an operation process for the user to obtain the second page is very simple, so that the solution provided by the present disclosure can optimize user experience to the greatest extent while improving information push efficiency.

Figure 2:
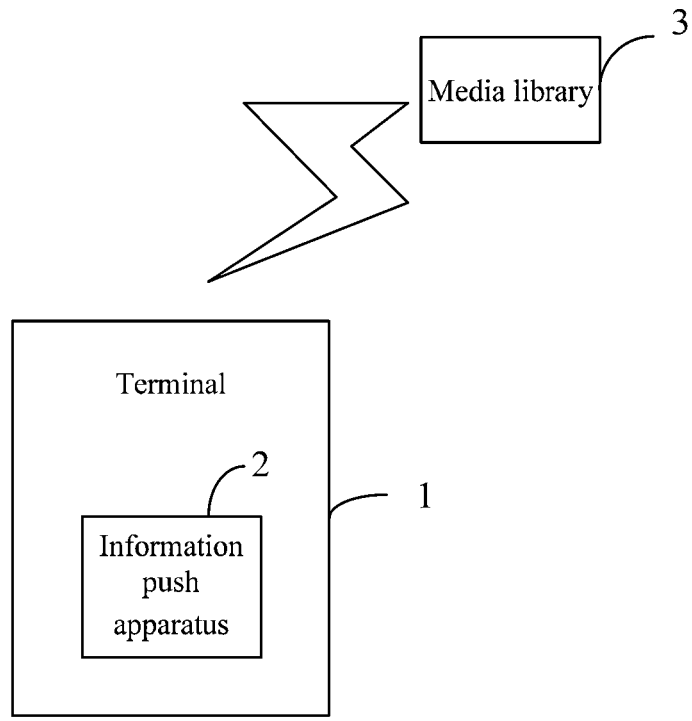
FIG. 2 is a schematic diagram of a network architecture on which the present disclosure is based.

Referring to FIG. 2, FIG. 2 is a schematic diagram of a network architecture on which the present disclosure is based. The network architecture shown in FIG. 2 may specifically include a terminal 1, an information push apparatus 2 and a media library 3.

Among them, the terminal 1 may specifically be a mobile phone of the user, a desktop computer, a smart home device, a tablet computer and other hardware devices that can be used to play media work information, the information push apparatus 2 may be a client or a display terminal of a media platform integrated or installed on the terminal 1, and the media library 3 may be a server of the media platform set in the cloud.

The information push apparatus 2 can run on the terminal 1 and provide a display page for to the terminal 1, for the terminal 1 to use its displayer or display component to display the page provided by the information push apparatus 2 to the user.

At the same time, the information push apparatus 2 may also interact with the media library 3 by using a network component of the terminal 1 to obtain information about media works, contents of media works and even some other information resources in the media library 3.

That is, the information push method based on the present disclosure may be specifically based on the embodiment shown in FIG. 2 and is suitable for an application scenario of pushing information of various media works. The media works therein include, but are not limited to, music works, literary works, film and television works and so forth. Correspondingly, the information push apparatus may specifically be a client or a display terminal of different types of media works, such as a music playing platform, a literary reading platform, and a film and television entertainment playing platform and so forth.

The method of the present disclosure is particularly applicable to scenarios such as information push of new songs, information push of new course videos, information push of hot literature and so forth.

Figure 3:
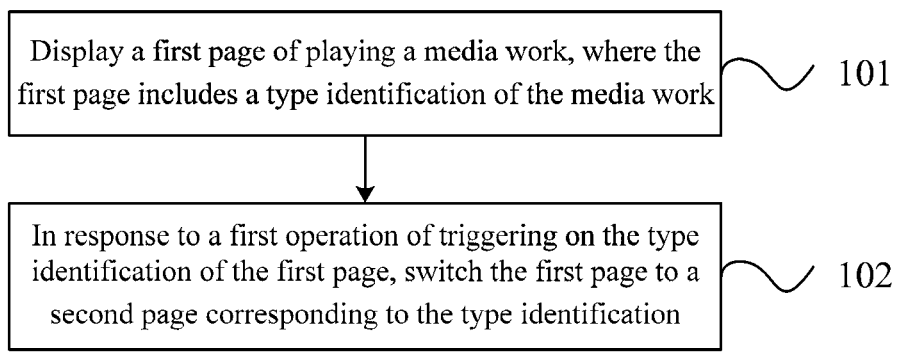
FIG. 3 is a schematic flowchart of an information push method provided by an embodiment of the present disclosure.

In a first aspect, referring to FIG. 3, FIG. 3 is a schematic flowchart of an information push method provided by an embodiment of the present disclosure. The information push method provided by the embodiment of the present disclosure includes:

Step 101: display a first page of playing a media work, where the first page includes a type identification of the media work;

Step 102: in response to a first operation of triggering on the type identification of the first page, switch the first page to a second page corresponding to the type identification.

It should be noted that an executive entity of the processing method provided by this example is the aforementioned information push apparatus. In some embodiments of the present disclosure, it specifically refers to a client or a display terminal of a media platform, and is either installed or integrated on the terminal, and can be presented to the user through an application interface or a control display interface. The user may interact with the information push apparatus through the terminal, and control it to obtain the displayed information or the played media work.

On the terminal, since the information push apparatus may specifically be the client of the media platform, it generally provides users with display and play functions for media works. In other words, a large number of media works may be displayed on the terminal, and the user may perform playing, pausing, switching and other playing operations on these media works through different touch control methods such as clicking, sliding, pressing and so forth.

The user selects a certain media work through some of the aforementioned touch control methods, to cause the terminal to play the media work. Different from the prior art, in the solution based on the present disclosure, the terminal will display a first page of playing the media work, where the first page may specifically be a page for playing the media work, and the first page should also include the type identification of the media work, which can be used to indicate a type or attribute of the media work, and which, at the same time, can be triggered as a trigger interface for the second page corresponding to the type or attribute.

For example, the type identification may be used to identify a release state of the media work, such as new song release or old song review and so forth; it may also be used to indicate a style type of the media work, such as made-up scenario, youth campus and so forth; obviously, the type identification may also be used to express a popularity of the media works, such as recent popular, celebrity recommended and so forth.

In addition, the type identification may also indicate a group attribute of a group to which some media works are targeted, such as for young children, for young students, for retirees and so forth. Moreover, the type identification may also be used to indicate a scene type to which a media work is applicable, such as sleep aid, party, fitness and so forth.

Therefore, in the embodiment provided by the present disclosure, after the user selects the media work to be played, the media platform will display, according to the media work selected by the user, the first page which is used for playing the media work and which includes the type identification.

Then, the user will be able to perform triggering on the type identification on the first page through triggering methods such as clicking, sliding, and pressing. At this time, the type identification will be used as the trigger interface, and in response to the first operation of triggering on the type identifications, the media platform will switch the first page to the second page corresponding to the type identification to replace the first page with the second page for displaying, and provide the second page for the user to browse.

In one of optional implementations, the first page includes a play page of the media work, and the second page includes an information push page of the media work.

Figure 4:
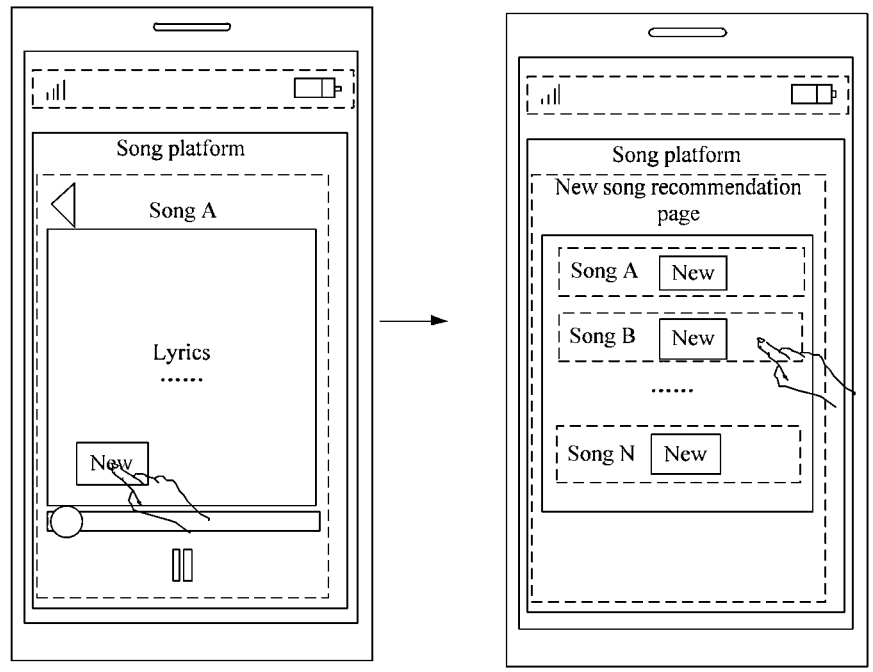
FIG. 4 is a schematic diagram of a first interactive interface provided by an embodiment of the present disclosure.

For example, FIG. 4 is a schematic diagram of a first interactive interface provided by an embodiment of the present disclosure. In the example shown in FIG. 4, a terminal is in a running state of playing a song using a client of a music platform. At this time, a play page for playing the song in the client will be considered as the first page for playing a media work mentioned in the present disclosure, and a type identification of the song is displayed on that page to indicate that the song is in a release state of new song release. When a user triggers the type identification on the play page, the page will jump from the play page to a recommendation information page such as a new song recommendation page on the terminal.

In another optional implementation, the first page includes a lock screen page of the media work, and the second page includes the information push page of the media work.

Figure 5:
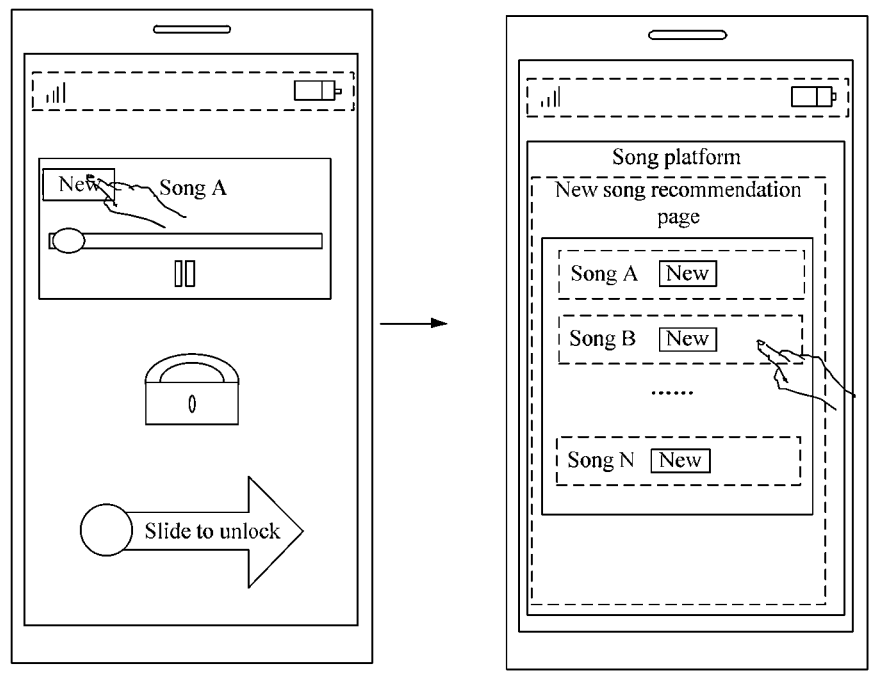
FIG. 5 is a schematic diagram of a second interactive interface provided by an embodiment of the present disclosure.

For example, FIG. 5 is a schematic diagram of a second interactive interface provided by an embodiment of the present disclosure. In an example shown in FIG. 5, a terminal is in a lock screen state, but a client of a music platform is still running in the background and providing a playing service for the user. At this time, the lock screen page will be considered as the first page for playing a media work mentioned in the present disclosure, and a type identification of a song is displayed on that page to indicate that the song is in a release state of new song release. When a user triggers the type identification on the lock screen page, the page will jump from the lock screen page to a recommendation information page such as a new song recommendation page on the terminal.

As for the second page, it is pre-generated by a media library of the media platform, and it should be associated with the type or attribute indicated by the type identification. In other optional embodiments, in order to further simplify the operation process, the second page may include information associated with the type or attribute in the media library of the media platform, such as other associated media works and so forth.

In addition, since the type identification may also indicate other types or other attributes of the media work, the second page may include other media works of a different type based on difference information of the type identification.

For instance, in another example, when the type identification indicates that a popularity of a video work of a certain TV series is popular recommendation, after the user triggers the type identification, an interface may jump to a second page including a popular recommendation page of TV series.

For another instance, in another example, when the type identification indicates that a style type of a certain literary work is suspenseful reasoning, after the user triggers the type identification, the interface may jump to a second page including a recommendation page of suspenseful reasoning works.

In order to further simplify the process for the user to obtain information, based on the above implementations, the user can directly select any media work to be played from a plurality of media works to be played on the second page, and the terminal will directly play the selected media work.

That is, in an embodiment, the information push page includes a plurality of media works to be played; after step 102, the method further includes: in response to a second operation of triggering on any media work to be played on the second page, playing the media work selected by the second operation.

In an optional embodiment, while playing the media work selected by the second operation, the page may not be switched, and the second page may be kept displayed. That is, when the media work selected by the second operation is played, the second page is displayed.

Figure 6:
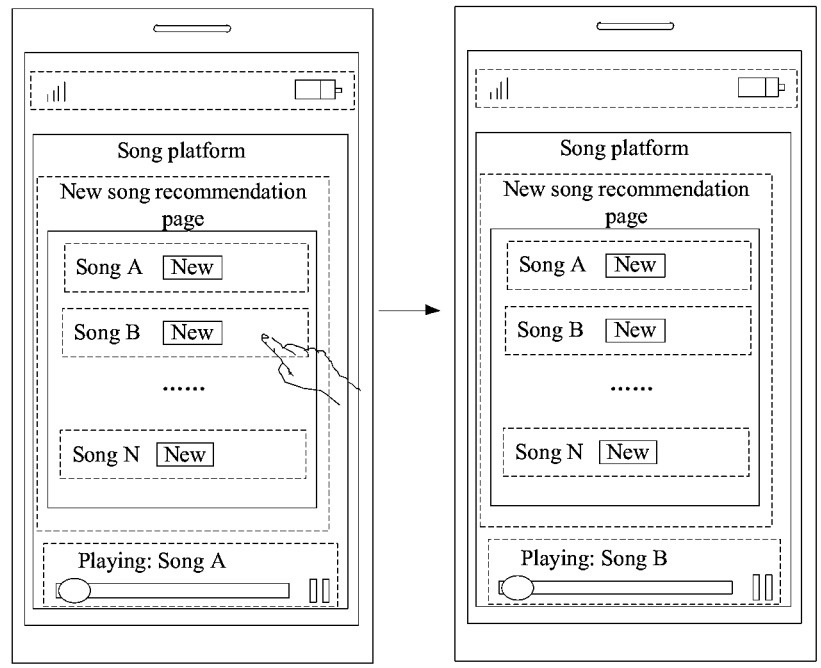
FIG. 6 is a schematic diagram of a third interactive interface provided by an embodiment of the present disclosure.

FIG. 6 is a schematic diagram of a third interactive interface provided by an embodiment of the present disclosure. As shown in FIG. 6, in this example, when a user selects a new song B from a number of new songs provided on a new song recommendation page, the media platform will start to play the new song B. At this time, in order to facilitate the user to continue to browse other media works on the second page, the page will stay on the second page and continue to provide the user with information of other media works.

In an optional embodiment, while playing the media work selected by the second operation, the page may be switched synchronously or asynchronously to display a first page for playing the selected media work. That is, when the media work selected by the second operation is played, switching is performed to display the first page for playing the media work selected by the second operation.

Figure 7:
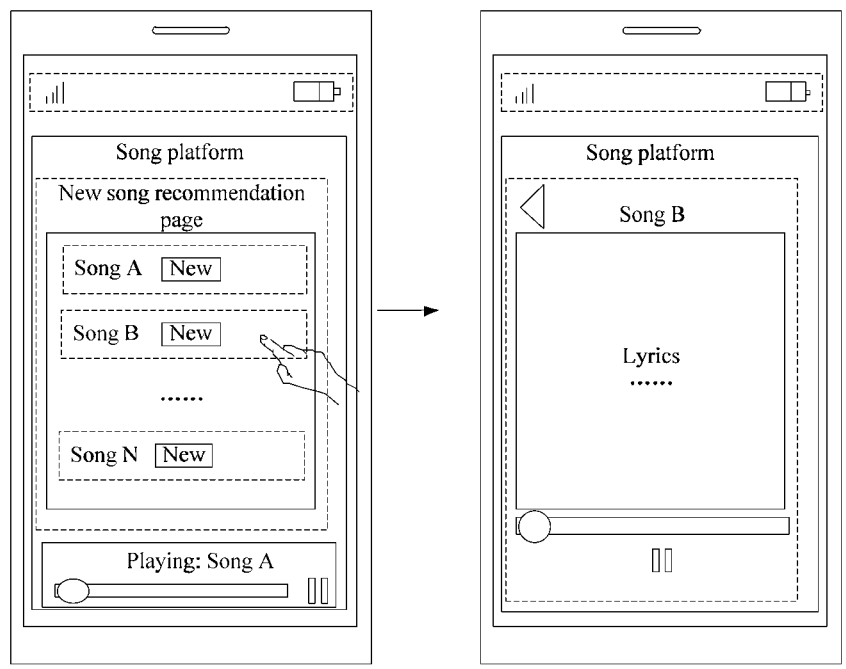
FIG. 7 is a schematic diagram of a fourth interactive interface provided by an embodiment of the present disclosure.

FIG. 7 is a schematic diagram of a fourth interactive interface provided by an embodiment of the present disclosure. As shown in FIG. 7, in this example, when a user selects a new song B from a number of new songs provided on a new song recommendation page, a media platform will start to play the new song B. At this time, in order to facilitate the user obtaining a better play experience and browsing related information of the new song B, the page is switched from a second page to a first page of the new song B. It should be noted that the first page may be a play page or a lock screen page as described above, and FIG. 7 takes the play page as an example for illustration.

The solution provided by the present disclosure displays the type identification corresponding to the media work when the first page of playing the media work is displayed, and switches the page when a user triggers the type identification on the first page, so as to display the second page corresponding to the type identification to the user. Since information of other media works corresponding to the type identification of the media work can be displayed on the second page, the user's demand for obtaining push information can be effectively met; at the same time, since the user can directly obtain the second page in a manner of direct triggering the type identification, the obtaining operation process is very concise, and thus the solution provided by the present disclosure can optimize the user experience to the greatest extent while improving information push efficiency.

Figure 8:
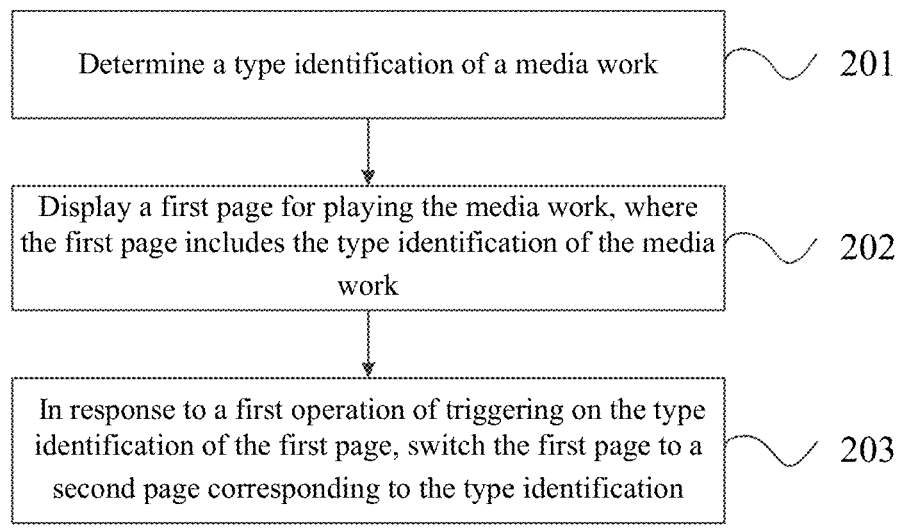
FIG. 8 is a schematic flowchart of another information push method provided by an embodiment of the present disclosure.

On the basis of the foregoing embodiments, FIG. 8 is a schematic flowchart of another information push method provided by an embodiment of the present disclosure. As shown in FIG. 8, the method further includes:

Step 201: determine a type identification of a media work.
Step 202: display a first page of playing the media work, where the first page includes the type identification of the media work;
Step 203: in response to a first operation of triggering on the type identification of the first page, switch the first page to a second page corresponding to the type identification.

Different from the foregoing embodiment, this embodiment also includes a step for determining the type identification. Specifically, for each media work, the type identification displayed on its first page is determined by a media platform according to relevant information of the media.

In this embodiment, when the type identification indicates a different type or attribute, the method for determination will be correspondingly different, which will be explained in the following for different situations, respectively.

In an optional implementation, the type identification may be used to indicate a release state of the media work, and the step for determining the type identification of the media work may be implemented in the following ways.

The media platform will determine a release timestamp of the media work to determine the release state of the media work based on a current timestamp and the release timestamp, where the release timestamp is determined according to creation time of the media work and a release cycle.

Specifically, the release state refers to whether the media work is a new media work, the creation time refers to a time when the media work is first released after a copyright is obtained, and the release cycle refers to a length of time that the media work is considered as a new media work.

For example, if a music platform obtained the copyright of a song on Jan. 1, 2020 and the song was released for the first time on that day, and the release cycle is 1 month, then the release timestamp of the song is Feb. 1, 2020. The release state of the song is determined according to the release timestamp: it is a new song from Jan. 1, 2020 to Feb. 1, 2020, and it is not a new song after Feb. 1, 2020. It should be noted that the release cycle may be 1 month or may also be 2 weeks, and the length of the release cycle can be set according to an actual situation.

The release timestamp of the media work can be determined by using the creation time of the media work and the release cycle, and the release state of the media work can be determined, so as to determine whether the type identification of the media work is new media work or non-new media work, so that information of other works related to the release state can be shown to a user after the user triggers the type identification subsequently.

Generally speaking, the release timestamp is determined by a media library, but since the release timestamp needs to be obtained every time the media work is played, this method will increase operating pressure and communication overhead of the media library.

In order to avoid this problem, on the basis of the foregoing embodiment, in an embodiment, the media platform of the terminal may also include a timestamp cache list. Correspondingly, the media platform may determine whether the release timestamp of the media work is stored in the timestamp cache list when determining the release timestamp of the media work, and if not, sends an acquisition request to the media library, and receives the release timestamp of the media work returned by the media library, and caches the release timestamp in the timestamp cache list.

On the basis of this embodiment, in order to reduce storage pressure of the media platform on the terminal, the media platform may also clean the release timestamps of respective media works stored in the timestamp cache list according to a preset cache cleaning cycle.

Specifically, the timestamp cache list also includes storage time of each release timestamp; that is, for each release timestamp in the timestamp cache list, it is determined whether a difference value between the storage time of the release timestamp and current time is greater than or equal to the cache cleaning period; if so, the release timestamp is cleaned.

For example, the cache cleaning cycle of the release timestamp is controllable. If the cache cleaning cycle is set to be 2 months, and if the timestamp cache list stores the release timestamps of 10,000 songs, of which the storage times of the release timestamps of 100 songs are 12:00 on Jan. 1, 2020, and the current time is 13:00 on Mar. 1, 2020, then the storage times of the 100 songs exceed the cache cleaning cycle, and the release timestamps of the 100 songs are cleaned.

For another example, cache cleaning may also be set to be regular cleaning. If a time for regular cleaning is set to 0:00 on the 15th of each month, then release timestamps of songs stored in the cache list will be cleaned on the 15th of each month.

By caching the release timestamps of the media works, the number of requests to the media library is reduced, the operating pressure and the communication load of the media library are reduced, and further, by setting the cache cleaning cycle to clean the cache of release timestamps, the storage pressure of the terminal is reduced.

In other optional embodiments, the type identification may also be used to indicate a work style type of the media work, and the step for determining the type identification of the media work may be implemented in the following way: determining release information of the media work; and determining the work style type of the media work according to the release information.

Specifically, the release information refers to released basic information of the media work when the media work is released, and the style type of the media work may be identified according to the release information.

For example, the released basic information of a certain song when it is released includes: title, album, track, artist, lyricist, composer, arranger, release date, language, style, record company and so forth. Through analysis on the basic information of the song, the style type of the song is determined, such as rock, folk, love song and so forth.

Similarly, in other examples, the released basic information of a certain movie when it is released includes: movie title, director, producer, release time, starring role, movie type, movie company and so forth. Through analysis on the basic information of the movie, the style type of the movie is determined, such as suspense, thriller, love and so forth.

For another example, in other examples, the released basic information of a certain book when it is issued includes: book title, book number, author, language, book introduction, publisher and so forth. Through analysis on the basic information of the book, the style type of the book is determined, such as science, military, philosophy and so forth.

By using the release information of the media work, the work style type of the media work can be determined, and the type of the media work is automatically identified according to the work style, so that work information related to the work style type can be displayed for a user after the user triggers the type identification subsequently.

In another optional embodiment, the type identification is also used to indicate a popularity of the media work, and the step for determining the type identification of the media work may be specifically implemented in the following manner determining comment information of the media work, and then determining the popularity of the media work according to the comment information.

Specifically, a user may comment on a media work after browsing the media work, and information of the comment may be text, voice, an emoticon or a picture and so forth, and the number of pieces of the comment information represents the popularity of the media works. During information push, the type identification about the popularity of the media work may be determined through capturing the amount of the comment information.

For example, if a song has been released on a song platform for one year and received 10 million pieces of comment information, another song has also been released on the song platform for one year and received 1,000 pieces of comment information, and then it can be determined that the popularity of the former one is relatively high, and the popularity of the latter one is relatively low.

The popularity of the song may be determined by using the comment information, and the type identification corresponding to the popularity may be displayed on its play page, so that information about other works with similar popularity can be presented to the user after the user triggers the type identification subsequently.

In yet another optional implementation, the type identification is also used to indicate a scene type to which the media work is applicable, and the step for determining the type identification of the media work may be specifically implemented in the following manner: determining comment information of the media work, and then performing a semantic analysis or keyword extraction analysis according to the comment information to determine the scene type to which the media work is applicable.

Specifically, a user may comment on a media work after browsing the media work, the scene type to which the media work is applicable may be determined through grasping and analyzing keywords in the comment, such as "passion", "sleeping", "calm", "lively" and so forth.

For example, when a certain electronic music has been released on a song platform for one year, and posted comment information contains a large number of keywords that are suitable for the scene of party, such as "special for disco", "dancing music style" and so forth, it can be inferred that, the scene type to which the electronic music is applicable is a party scene.

In another optional implementation, the type identification is also used to indicate a group attribute of a group to which the media work is targeted, and the step for determining the type identification of the media work may be implemented in the following manner: determining comment information of the media work, and then determining the group attribute of the group to which the media work is targeted according to the comment information.

Specifically, a user may comment on a media work after browsing the media works, and the group attribute of the group to which the media work is targeted may be determined by analyzing the attribute of the user who posted the comment.

For example, if a certain children's song has been released on the song platform for one year, the vast majority of users who posted comment information are young parents, then from the comment content of the comment information of the children's song, it can be inferred that the group attribute of the group to which the children's song is targeted is young children.

Similar to the foregoing embodiments, after the determination of the type identification is completed, steps 202-203 will be performed, which are similar to steps 101-102 in the foregoing embodiment, and will not be detailed in this embodiment.

On the basis of the foregoing embodiment, this embodiment provides different determination methods for different kinds of type identification, and especially the manner of timestamp is adopted for the type identification that identifies the release state of the media work, which can effectively improve a processing speed when determining the type identification and reduce the operating overhead of the media library.

Figure 9:
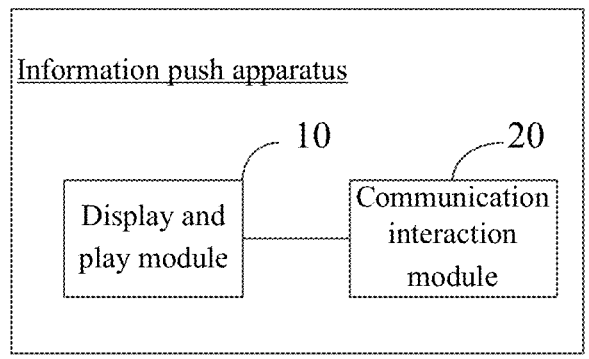
FIG. 9 is a structural block diagram of an information push apparatus 25 provided by an embodiment of the present disclosure.

Corresponding to the information push method of the above embodiments, FIG. 9 is a structural block diagram of an information push apparatus provided by an embodiment of the present disclosure. For ease of description, only parts related to the embodiments of the present disclosure are shown. Referring to FIG. 9, the information push apparatus includes: a display and play module 10 and a communication interaction module 20.

The display and play module 10 is configured to display a first page of a media work, where the first page includes a type identification of the media work.

The communication interaction module 20 is configured to respond to a first operation of triggering on the type identification of the first page.

The display and play module 10 is further configured to switch the first page to a second page corresponding to the type identification.

In an optional implementation, the second page includes a plurality of media works to be played;
the communication interaction module 20 is further configured to respond to a second operation of triggering on any media work to be played on the second page, to provide for the display and play module 10 to play the media work selected by the second operation.

In an optional implementation, the display and play module 10 is further configured to display the second page when the media work selected by the second operation is displayed.

In an optional implementation, the display and play module 10 is further configured to switch to display the first page for playing the media work selected by the second operation when the media work selected by the second operation is displayed.

In an optional implementation, the apparatus further includes: a processing module;
the processing module is configured to determine the type identification of the media work.

In an optional implementation, the type identification is used to indicate a release state of the media work.

In an optional implementation, the processing module is configured to determine a release timestamp of the media work; and determine the release state of the media work according to a current timestamp and the release timestamp.

In an optional implementation, the release timestamp is determined according to creation time of the media work and a release cycle.

In an optional implementation, the processing module is configured to determine whether the release timestamp of the media work is stored in a timestamp cache list; if not, send an acquisition request to a media library, and cache the release timestamp of the media work returned by the media library in the timestamp cache list.

In an optional implementation, the processing module is further configured to clean release timestamps of media works stored in the timestamp cache list according to a preset cache cleaning cycle.

In an optional embodiment, the timestamp cache list further includes storage times of the release timestamps; the processing module is specifically configured to, for each release timestamp in the timestamp cache list, determine whether a difference value between the storage time of the each release timestamp and current time is greater than or equal to a pre-stored cache cleaning cycle;
if yes, then clean the each release timestamp.

In an optional implementation, the type identification is used to indicate a work style type of the media work.

In an optional implementation, the processing module is specifically configured to determine release information of the media work; and determine the work style type of the media work according to the release information.

In an optional implementation, the type identification is used to indicate a popularity of the media work.

In an optional implementation, the processing module is specifically configured to determine comment information of the media work, and then determine the popularity of the media work according to the comment information.

In an optional implementation, the type identification is also used to indicate a group attribute of a group to which the media work is targeted.

In an optional implementation, the processing module is specifically configured to determine comment information of the media work, and determine the group attribute of the group to which the media work is targeted according to the comment information.

In an optional implementation, the type identification is also used to indicate a scene type to which the media work is applicable.

In an optional implementation, the processing module is specifically configured to determine comment information of the media work, and determine the scene type to which the media work is applicable according to the comment information.

In an optional implementation, the first page includes a play page of the media work.

In an optional implementation, the first page includes a lock screen page.

In an optional implementation, the second page includes an information push page of the media work.

The solution provided by the present disclosure also displays the type identification corresponding to the media work while displaying the first page of playing the media work, and switches the page when the user triggers the type identification on the first page, to display the second page corresponding to the type identification to the user. Since information of other media works corresponding to the type identification of the media work can be displayed on the second page, the user's demand for obtaining push information can be effectively met; and at the same time, since the user can directly obtain the second page in a manner of directly triggering the type identification, and the obtaining operation process is very concise, then the solution provided by the present disclosure can optimize an user experience to the greatest extent while improving information push efficiency.

An electronic device provided by this embodiment can be used to implement the technical solutions of the foregoing method embodiments, and its implementation principles and technical effects are similar, and will not be detailed in this embodiment.

Figure 10:
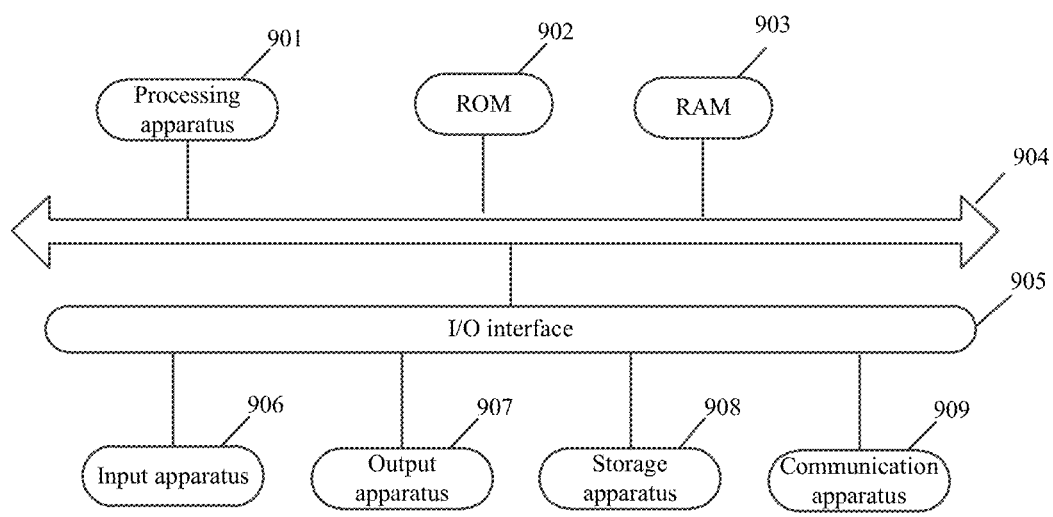
FIG. 10 is a schematic diagram of a hardware structure of an electronic device provided by an embodiment of the present disclosure.

Referring to FIG. 10, it shows a schematic structural diagram of an electronic device 900 suitable for implementing embodiments of the present disclosure. The electronic device 900 may be a terminal device or a media library. The terminal device may include, but are not limited to, a mobile terminal, such as a mobile phone, a notebook computer, a digital broadcast receiver, a personal digital assistant (PDA), a portable android device (PAD), a portable media player (PMP), an in-vehicle terminal (for example, a vehicle navigation terminal) and so forth, and a fixed terminal, such as a digital TV, a desktop computer and so forth. The electronic device shown in FIG. 10 is only an example, and should not bring any limitation to the functions and use scope of the embodiments of the present disclosure.

As shown in FIG. 10, the electronic device 900 may include an information push apparatus (for example, a central processing unit, a graphics processor and so forth) 901, which can perform various appropriate actions and processing based on a program stored in a read only memory (ROM) 902 or a program loaded into a random access memory (RAM) 903 from a storage device 908. In the RAM 903, various programs and data required for the operation of the electronic device 900 are also stored. The information push apparatus 901, the ROM 902 and the RAM 903 are connected to each other through a bus 904. An input/output (I/O) interface 905 is also connected to the bus 904.

Generally, the following devices can be connected to the I/O interface 905: an input apparatus 906 including, for example, a touch screen, a touch pad, a keyboard, a mouse, a camera, a microphone, an accelerometer, a gyroscope and so forth; an output apparatus 907 including, for example, a liquid crystal display (LCD), a speaker, a vibrator and so forth; a storage apparatus 908 including, for example, a magnetic tape, a hard disk and so forth; and a communication apparatus 909. The communication device 909 may allow the electronic device 900 to perform wireless or wired communication with other devices to exchange data. Although FIG. 10 shows the electronic device 900 having various apparatus, it should be understood that it is not required to implement or have all of the illustrated apparatus, and it may alternatively be implemented by or have more or fewer apparatus.

In particular, on the basis of the embodiments of the present disclosure, the processes described above with reference to the flowcharts can be implemented as a computer software program. For example, an embodiment of the present disclosure includes a computer program product, which includes a computer program carried on a computer-readable medium, and the computer program includes program code for executing the method shown in the flowchart. In such an embodiment, the computer program may be downloaded from the network and installed through the communication device 909, or installed from the storage device 908, or installed from the ROM 902. The above functions defined in the method according to the embodiment of the present disclosure are performed when the computer program is executed by the information push apparatus 901.

It should be noted that the aforementioned computer-readable medium in the present disclosure may be a computer-readable signal medium or a computer-readable storage medium, or any combination of them. The computer-readable storage medium may be, but not limited to, for example, an electrical, magnetic, optical, electromagnetic, infrared or semiconductor system, apparatus or device, or a combination of any of the above. More specific examples of the computer-readable storage media may include, but are not limited to: an electrical connection with one or more wires, a portable computer disk, a hard disk, a random access memory (RAM), a read-only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program, and the program may be for use by or in combination with an instruction execution system, apparatus or device. In the present disclosure, the computer-readable signal medium may include a data signal propagated in a baseband, or as a part of a carrier, where the data signal carries the computer-readable program code. This propagated data signal may take many forms, including but not limited to an electromagnetic signal, an optical signal, or any suitable combination of them. The computer-readable signal medium may also be any computer-readable medium other than the computer-readable storage medium. The computer-readable signal medium may send, propagate, or transmit the program for use by or in combination with the instruction execution system, apparatus or device. The program code contained on the computer-readable medium can be transmitted by any suitable medium, including but not limited to: wire, optical cable, radio frequency (RF) and so forth, or any suitable combination of the above.

The computer-readable medium may be included in the above-mentioned electronic device; or it may exist alone without being assembled into the electronic device.

The computer-readable medium carries one or more programs, and when the one or more programs are executed by the electronic device, the electronic device is caused to execute the method shown in the foregoing embodiment.

The computer program code used to perform the operations of the present disclosure may be written in one or more programming languages or a combination thereof. The programming languages include object-oriented programming languages, such as Java, Smalltalk, C++, and also include conventional procedural programming language, such as "C" language or similar programming language. The program code can be executed entirely on a user computer, partly on a user computer, executed as an independent software package, executed partly on a user computer and partly on a remote computer, or entirely executed on a remote computer or a media library. In the case of a remote computer, the remote computer may be connected to the user computer through any kind of network, including a local area network (LAN) or a wide area network (WAN), or, it can be connected to an external computer (for example, using an Internet service provider to connect via the Internet).

The embodiments of the present disclosure also provide a computer program, the computer program is stored in a readable storage medium, at least one processor of an electronic device can read the computer program from the readable storage medium, and the at least one processor executes the computer program, to cause the electronic device to execute the method provided in any of the foregoing embodiments.

The flowcharts and block diagrams in the drawings illustrate possible implementation architectures, functions and operations of the system, method and computer program product according to various embodiments of the present disclosure. In this regard, each block in the flowchart or block diagram may represent a module, program segment, or part of code, and the module, program segment, or part of code contains one or more executable instructions for realizing a specified logic function. It should also be noted that, in some alternative implementations, the functions marked in the blocks may also occur in a different order from the order marked in the drawings. For example, two blocks shown in succession can actually be executed substantially in parallel, and they can sometimes be executed in a reverse order, which depends on the functions involved. It should also be noted that, each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units involved and described in the embodiments of the present disclosure can be implemented in software or hardware, where a name of a unit does not constitute a limitation on the unit itself under certain circumstances. For example, a first obtaining unit may also be described as "a unit for obtaining at least two Internet Protocol addresses."

The functions described hereinabove may be executed at least in part by one or more hardware logic components. For example, without limitation, exemplary types of the hardware logic components that can be used include: a Field Programmable Gate Array (FPGA), an Application Specific Integrated Circuit (ASIC), an Application Specific Standard Product (ASSP), a System On Chip (SOC), a Complex Programmable Logic Device (CPLD) and so forth.

In the context of the present disclosure, a machine-readable medium may be a tangible medium, which may contain or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage media would include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

The following are some embodiments of the present disclosure.

In a first aspect, according to one or more embodiments of the present disclosure, an information push method includes:
displaying a first page of playing a media work, where the first page includes a type identification of the media work;
in response to a first operation of triggering on the type identification of the first page, switching the first page to a second page corresponding to the type identification.

In an optional embodiment provided by the present disclosure, the second page includes a plurality of media works to be played;
the method further includes:
in response to a second operation of triggering on any media work to be played on the second page, playing the media work selected by the second operation.

On the basis of the foregoing embodiments, the second page is displayed when the media work selected by the second operation is played.

On the basis of the foregoing embodiments, the first page for playing the media work selected by the second operation is switched to be displayed when the media work selected by the second operation is played.

On the basis of the foregoing embodiments, the method further includes:
determining the type identification of the media work.

On the basis of the foregoing embodiments, the type identification is used to indicate a release state of the media work.

On the basis of the foregoing embodiments, the determining the type identification of the media work includes:
determining a release timestamp of the media work;
determining the release state of the media work according to a current timestamp and the release timestamp.

On the basis of the foregoing embodiments, the release timestamp is determined according to creation time of the media work and a release cycle.

On the basis of the foregoing embodiments, the determining the release timestamp of the media work includes:
determining whether the release timestamp of the media work is stored in a timestamp cache list;
if not, sending an acquisition request to a media library, and caching the release timestamp of the media work returned by the media library in the timestamp cache list.

On the basis of the foregoing embodiments, the method further includes:
cleaning release timestamps of media works stored in the timestamp cache list according to a preset cache cleaning cycle.

On the basis of the foregoing embodiments, the timestamp cache list further includes storage times of the release timestamps;
where the cleaning the release timestamps of the media works stored in the timestamp cache list according to a preset cache cleaning cycle includes:
for each release timestamp in the timestamp cache list, determining whether a difference value between the storage time of the each release timestamp and current time is greater than or equal to the pre-stored cache cleaning cycle;
if yes, then cleaning the each release timestamp.

On the basis of the foregoing embodiments, the type identification is used to indicate a work style type of the media work.

On the basis of the foregoing embodiments, the determining the type identification of the media work includes:
determining release information of the media work;
determining the work style type of the media work according to the release information.

On the basis of the foregoing embodiments, the type identification is used to indicate a popularity of the media work.

On the basis of the foregoing embodiments, the determining the type identification of the media work includes:
determining comment information of the media work, and then determining the popularity of the media work according to the comment information.

On the basis of the foregoing embodiments, the type identification is also used to indicate a group attribute of a group to which the media work is targeted.

On the basis of the foregoing embodiments, the determining the type identification of the media work includes:
determining comment information of the media work, and determine the group attribute of the group to which the media work is targeted according to the comment information.

On the basis of the foregoing embodiments, the type identification is also used to indicate a scene type to which the media work is applicable.

On the basis of the foregoing embodiments, the determining the type identification of the media work includes:
determining comment information of the media work, and determining the scene type to which the media work is applicable according to the comment information.

On the basis of the foregoing embodiments, the first page includes a play page of the media work.

On the basis of the foregoing embodiments, the first page includes a lock screen page.

On the basis of the foregoing embodiments, the second page includes an information push page of the media work.

In a second aspect, according to one or more embodiments of the present disclosure, an information push apparatus includes:

a display and play module, configured to display a first page of a media work, where the first page includes a type identification of the media work;

a communication interaction module, configured to respond to a first operation of triggering on the type identification of the first page;

the display and play module, further configured to switch the first page to a second page corresponding to the type identification.

In an optional implementation, the second page includes a plurality of media works to be played;

the communication interaction module is further configured to respond to a second operation of triggering on any media work to be played on the second page, to provide for the display and play module to play the media work selected by the second operation.

In an optional implementation, the display and play module is further configured to display the second page when the media work selected by the second operation is played.

In an optional implementation, the display and paly module is further configured to switch to display the first page for playing the media work selected by the second operation when the media work selected by the second operation is played.

In an optional implementation, further include: a processing module;

the processing module is configured to determine the type identification of the media work.

In an optional implementation, the type identification is used to indicate a release state of the media work.

In an optional implementation, the processing module is used to determine a release timestamp of the media work; and determine the release state of the media work according to a current timestamp and the release timestamp.

In an optional implementation, the release timestamp is determined according to creation time of the media work and a release cycle.

In an optional implementation, the processing module is configured to determine whether the release timestamp of the media work is stored in a timestamp cache list; if not, send an acquisition request to the media library, and cache the release timestamp of the media work returned by the media library in the timestamp cache list.

In an optional implementation, the processing module is further configured to clean release timestamps of media works stored in the timestamp cache list according to a preset cache cleaning cycle.

In an optional embodiment, the timestamp cache list further includes storage times of the release timestamps; the processing module is specifically configured to, for each release timestamp in the timestamp cache list, determine whether a difference value between the storage time of the each release timestamp and current time is greater than or equal to a pre-stored cache cleaning cycle;

if yes, then clean the each release timestamp.

In an optional implementation, the type identification is used to indicate a work style type of the media work.

In an optional implementation, the processing module is specifically configured to determine release information of the media work; and determine the work style type of the media work according to the release information.

In an optional implementation, the type identification is used to indicate a popularity of the media work.

In an optional implementation, the processing module is specifically configured to determine comment information of the media work, and then determine the popularity of the media work according to the comment information.

In an optional implementation, the type identification is also used to indicate a group attribute of a group to which the media work is targeted.

In an optional implementation, the processing module is specifically configured to determine comment information of the media work, and determine the group attribute of the group to which the media work is targeted according to the comment information.

In an optional implementation, the type identification is also used to indicate a scene type to which the media work is applicable.

In an optional implementation, the processing module is specifically configured to determine comment information of the media work, and determine the scene type to which the media work is applicable according to the comment information.

In an optional implementation, the first page includes a play page of the media work.

In an optional implementation, the first page includes a lock screen page.

In an optional implementation, the second page includes an information push page of the media work.

In a third aspect, according to one or more embodiments of the present disclosure, an electronic device includes: at least one processor and a memory;

the memory stores computer-executable instructions;

the at least one processor executes the computer-executable instructions stored in the memory to cause the at least one processor to execute the information push method according to any one of the preceding items.

In a fourth aspect, according to one or more embodiments of the present disclosure, a computer-readable storage medium stores computer-executable instructions, and when a processor executes the computer-executable instructions, the information push method according to any of the preceding items is implemented.

The above description is merely an explanation of preferred embodiments of the present disclosure and the applied technical principles. Those skilled in the art should understand that the scope of disclosure involved in the present disclosure is not limited to the technical solutions formed by the specific combination of the above technical features, and should also cover other technical solutions formed by arbitrarily combining the above technical features or the equivalent features without departing from the above disclosed concept. For example, a technical solution formed by replacing the above-mentioned features with the technical features having similar functions disclosed in the present disclosure (but not limited to).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as a limitation for the scope of the present disclosure. Certain features that are described in the context of separate embodiments may also be implemented in combination in a single embodiment. Conversely, respective features described in the context of a single embodiment may also be implemented in multiple embodiments individually or in any suitable sub-combination.

Although the subject matter has been described in language specific to structural features and/or method logical actions, it should be understood that the subject matter defined in the appended claims is not necessarily limited to specific features or actions described above. On the contrary, the specific features and actions described above are merely example forms for implementing the claims.

What is claimed is:

1. An information push method, the method comprising:
displaying a first page of playing a media work, wherein the first page comprises a type identification of the media work, wherein the type identification is used to indicate a release state of the media work, and the release state refers to whether the media work is a new media work; and
in response to a first operation of triggering on the type identification of the first page, switching the first page to a second page corresponding to the type identification,
wherein the method further comprises:
determining the release state of the media work;
wherein the determining the release state of the media work comprises the following steps 1) and 2):
step 1): determining a release timestamp of the media work, wherein the release timestamp is determined according to creation time of the media work and a release cycle, the creation time refers to a time when the media work is first released after a copyright is obtained, the release cycle refers to a length of time that the media work is considered as the new media work, release timestamps of media works are stored in a timestamp cache list, and the timestamp cache list further comprises storage times of the release timestamps; and
step 2): determining the release state of the media work according to a current timestamp and the release timestamp.

2. The information push method according to claim 1, wherein-the second page comprises a plurality of media works to be played; and
the method further comprises:
in response to a second operation of triggering on any media work to be played on the second page, playing the media work selected by the second operation.

3. The information push method according to claim 2, wherein the playing the media work selected by the second operation comprises:
when playing the media work selected by the second operation, displaying the second page.

4. The information push method according to claim 2, wherein the playing the media work selected by the second operation comprises:
when playing the media work selected by the second operation, switching to display a first page for playing the media work selected by the second operation.

5. The information push method according to claim 1, wherein the determining the release timestamp of the media work comprises:
determining whether the release timestamp of the media work is stored in the timestamp cache list; and
upon determining that the release timestamp of the media work is not stored in the timestamp cache list, sending an acquisition request to a media library, and caching the release timestamp of the media work returned by the media library in the timestamp cache list.

6. The information push method according to claim 5, wherein the method further comprises:

upon determining that the release timestamp of the media work is stored in the timestamp cache list, cleaning the release timestamps of the media works stored in the timestamp cache list according to a preset cache cleaning cycle.

7. The information push method according to claim 6, wherein the cleaning the release timestamps of the media works stored in the timestamp cache list according to the preset cache cleaning cycle comprises:
for each release timestamp of the release timestamps in the timestamp cache list, determining whether a difference value between the storage time of the each release timestamp and current time is greater than or equal to the pre-stored cache cleaning cycle; and
upon determining that the difference value between the storage time of the each release timestamp and current time is greater than or equal to a pre-stored cache cleaning cycle, cleaning the each release timestamp.

8. The information push method according to claim 1, wherein the type identification is further used to indicate a work style type of the media work.

9. The information push method according to claim 8, wherein determining the work style type of the media work comprises:
determining release information of the media work; and
determining the work style type of the media work according to the release information.

10. The information push method according to claim 1, wherein the type identification is further used to indicate a popularity of the media work.

11. The information push method according to claim 1, wherein the first page comprises a play page of the media work.

12. The information push method according to claim 1, wherein the first page comprises a lock screen page.

13. The information push method according to claim 1, wherein the second page comprises an information push page of a media work.

14. The information push method according to claim 1, wherein the determining the release state of the media work according to the current timestamp and the release timestamp comprises:
upon determining that the current timestamp is later than the creation time of the media work and earlier than the release timestamp of the media work, determining the media work as the new media work.

15. An electronic device, comprising:
at least one processor and a memory;
the memory stores computer-executable instructions;
the at least one processor executes the computer-executable instructions stored in the memory to cause the at least one processor to:
display a first page of a media work, wherein the first page comprises a type identification of the media work, wherein the type identification is used to indicate a release state of the media work, and the release state refers to whether the media work is a new media work;
respond to a first operation of triggering on the type identification of the first page;
the at least one processor is further configured to switch the first page to a second page corresponding to the type identification;
wherein the at least one processor is further configured to determine the release state of the media work;
wherein the at least one processor is further configured to:
determine a release timestamp of the media work, wherein the release timestamp is determined according to creation time of the media work and a release cycle, the creation time refers to a time when the media work is first released after a copyright is obtained, the release cycle refers to a length of time that the media work is considered as the new media work, release timestamps of media works are stored in a timestamp cache list, and the timestamp cache list further comprises storage times of the release timestamps; and determine the release state of the media work according to a current timestamp and the release timestamp.

* * * * *